United States Patent Office 3,547,960
Patented Dec. 15, 1970

3,547,960
CATALYSTS FOR THE PREPARATION OF ACID HALIDES
Charles F. Hauser, Charleston, W. Va., assignor to Union Carbide Corporation, a corporation of New York
No Drawing. Filed June 19, 1968, Ser. No. 738,087
Int. Cl. C11c 3/00
U.S. Cl. 260—408
28 Claims

ABSTRACT OF THE DISCLOSURE

Process for preparing acid chlorides by reacting a carboxylic acid or acid anhydride with phosgene in the presence of select catalysts containing carbon-nitrogen double bonds or nitrogen-nitrogen double bonds. Illustrative catalysts are the substituted or unsubstituted imidazoles or hydrogen chloride salts thereof and 1,2,3-triazoles. The catalysts disclosed permit the use of lower temperatures, the avoidance of undesirable byproducts, and provide high yields of the desired acid chloride. The catalysts are also recoverable and may be recycled.

---

This invention relates to a process for the preparation of acid chlorides. More particularly, the invention relates to the utilization of novel catalysts for the preparation of acid chlorides by reaction of carboxylic acids or anhydrides with phosgene.

In recent years, certain carboxylic acid chlorides have become commercially important as reactive intermediates for the preparation of heat-resistant fibers and films as well as for pharmaceuticals and agricultural chemicals. Aliphatic acid chlorides, for example lauroyl chloride, have been used commercially for some time as intermediates in the preparation of peroxides and surfactants.

It is known to prepare carboxylic acid chlorides by reaction of the corresponding acids with chlorinating agents such as thionyl chloride or phosphorous trichloride. Phosgene can be substituted for the thionyl chloride or phosphorous trichloride, the former usually being employed in the presence of a tertiary amine catalyst. Phosgene, when compared with thionyl chloride and phosphorous trichloride, is a less expensive source of chlorine and would appear to be a more economical route for the preparation of acid chlorides. Unfortunately, however, phosgene is considerably less active at acceptable reaction temperatures and pressures than are the other chlorinating agents mentioned above and, until recently, has enjoyed only limited preparative utility.

Recently, the employment of carboxamide catalysts has allowed the phosgene reaction to be developed as a suitable preparative route for a large number of acid chlorides. These catalysts are capable of effecting the reaction of phosgene with many carboxylic acids and anhydrides at lower temperatures and in better yields than were formerly possible with tertiary amine catalysts. The reaction of carboxylic acids with phosgene in the presence of these carboxamide catalysts is not the panacea, however, since complications are often encountered with utilization of these carboxamides. For example, a serious disadvantage of employing carboxamide catalysts for the above reaction is that tarry, catalytically-inactive products are formed by the decomposition of the carboxamide/phosgene catalytic species. These by-products plug reactor valves and prevent effective catalyst recycle.

It was, therefore, desirable to find a process by which acid chlorides, utilizing phosgene as a reactant, could be prepared at low temperatures and in better yields without the disadvantage of producing undesirable by-products.

It is, therefore, an object of the present invention to provide a novel process for the preparation of acid chlorides. It is a further object to provide a continuous process for the preparation of acid chlorides by the reaction of a suitable acid with phosgene in the presence of catalysts which do not form tarry, catalytically-inactive, side-products as is characteristic of carboxamide catalysts.

These and other objects can be achieved by a process for producing acid chlorides which comprises reacting a suitable carboxylic acid or anhydride with phosgene in the presence of a catalytic amount of a catalyst as hereinafter defined.

The catalysts employed in the present invention are compounds selected from the group consisting of compounds of the general formula:

wherein R is

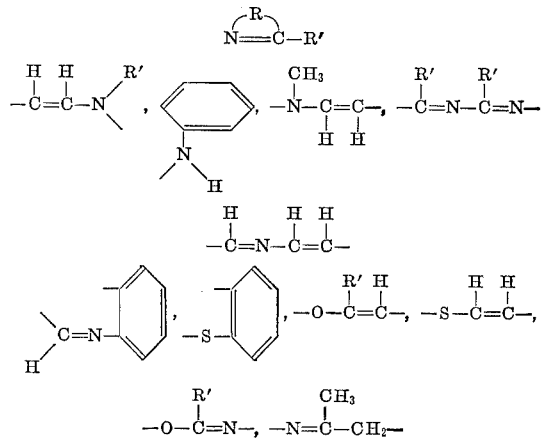

wherein R' is hydrogen or alkyl containing 1 to 4 carbon atoms; compounds of the formula:

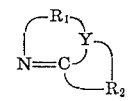

wherein $R_1$ is

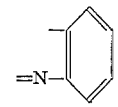

or a polymethylene group containing 3 to 5 carbon atoms, $R_2$ is

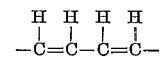

or a polymethylene group containing 3 to 5 carbon atoms, with the proviso that when $R_1$ is

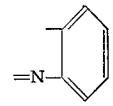

and $R_2$ is

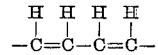

then $y$ is carbon, and when $R_1$ and $R_2$ are polymethylene groups of 3 to 5 carbon atoms, then $y$ is nitrogen; compounds of the formula:

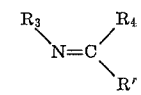

wherein $R_3$ is alkyl, an alicyclic group, or hydroxyl, $R_4$ is alkyl, aryl, or an

alicyclic group, R' is as above defined; compounds of the formula:

$$R_5—N=C—R_6$$

wherein $R_5$ is an alicyclic group, $R_6$ is an =N-alicyclic group; and compounds of the formula:

where x is

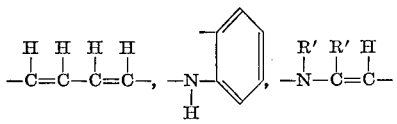

wherein R' is as above defined.

Suitable catalysts are, for example, imidazole, 1-methylimidazole, 2-methylimidazole, 1,2-dimethylimidazole, benzimidazole, 2,5-dimethylpyrazole, 2,4,6-triethyltriazine, 2,4,6-trimethyltriazine, benzotriazole, phenazine, 2-benzothiazole, 3,5-dimethylisoxazole, 1-N-butylimidazole, thiazole, 2,5-dimethyl-1,3,4-oxadiazole, 1,5-diazobicyclo [5.4.0]undec-5-ene, quinoxaline, pyrimidine, Shift's base of isobutyraldehyde and n-butyl Shift's base of benzaldehyde and methylamine, acetone oxime, Shift's base of glyoxal and cyclohexylamine, dicyclohexylcarbodiimide, pyridazine, 3 - n - butyl-4-methyl-1,2,3,-triazole, 2,5-dimethyl-1,3,4-oxadiazole, and the enamine of isobutyraldehyde and dimethylamine.

The preferred catalysts are imidazoles. They are used as such or in the form of their salts, for example, their hydrogen chloride salts.

The carboxylic acids which may be employed in practicing the present invention are the aliphatic carboxylic acids of 2 to about 20 carbon atoms, and the aromatic and cycloaliphatic carboxylic acids of 7 to about 24 carbon atoms. The suitable acids can contain 1 to 3 carboxyl groups. Illustrative of the suitable aliphatic acids one can mention are butyric acid, lauric acid, palmitic acid, acetic acid, neo-pentanoic acid, chloroacetic acid, dichloroacetic acid, adipic acid, sebacic acid, acrylic acid, methacrylic acid and the like. Illustrative of the suitable aromatic acids one can mention are benzoic acid, m-nitrobenzoic acid, isophthalic acid, phenylacetic acid, p-chlorobenzoic acid, trans-cinnamic acid, m-toluic acid, and the like. Illustrative of the suitable cycloaliphatic acids one can mention are cyclohexane carboxylic acid and the like.

The suitable acid anhydrides for the purpose of this invention are anhydrides of the general formula:

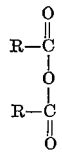

wherein each R represents an organic radical such as a hydrocarbon group. Particularly suitable acid anhydrides are those having an aliphatic, cycloaliphatic or aromatic group. Thus, R can be alkylene, alkenylene, cycloalkylene, arylene or like divalent, saturated and unsaturated radicals. Preferably, the number of carbon atoms in the R groups is from 1 to 24 and more preferably 1 to 12.

Illustrative acid anhydrides which can be employed include, among others, acetic anhydride, butyric anhydride, hexanoic anhydride, benzoic anhydride, trimellitic anhydride, octanoic anhydride, chloroacetic anhydride, acrylic anhydride, phenylacetic anhydride, adipic anhydride, sebacic anhydride, nitrobenzoic anhydride, chlorobenzoic anhydride, toluic anhydride, isophthalic anhydride and terephthalic anhydride.

By conducting the reaction in the manner hereinafter indicated, it has been found that the desired acid chlorides can be conveniently obtained in yields as high as 97.4 percent and higher and since undesirable by-products are either not formed, or formed in insignificant quantities, the catalyst can be advantageously recycled to the reaction zone for further contact with the reactants.

In practice, the novel catalysts of the present invention are employed in a catalytic amount. By the term "catalytic amount" is meant that quantity of the catalyst which will effectively catalyze the reaction between the carboxylic acid or acid anhydride and the phosgene to give the desired acid chloride in high yields. In general, it has been found that a catalyst concentration, based on the weight of the carboxylic acid or acid anhydride, of from about 0.012 to about 10 percent, and more, preferably from abuot 0.17 to about 1.0 percent is satisfactory. Catalyst concentrations above and below the aforementioned ranges can also be employed but are less preferred. If desired, and depending upon the manner in which the reaction is carried out, the catalyst can be employed on an inert carrier, such as a molecular sieve, or other porous material.

The improved process of the present invention is preferably conducted in the liquid phase. Moreover, the process can be effected in either a batch or continuous manner. For example, the reactants can be fed continuously through a stainless steel tubular reactor containing the novel catalysts on an inert support and equipped with the necessary temperature and pressure control. The desired residence time can be conveniently achieved by controlling the rate of reactants through the reactor. Alternatively, cyclic or two stage reactors can be employed as is known in the art.

Pressure is not necessarily critical and the reaction can be effected at atmospheric, subatmospheric or superatmospheric pressures. As a general rule, however, reactions under pressure are more easily controlled and generally faster than atmospheric reactions and are, therefore, preferred. Thus, preferably, the reaction is conducted under superatmospheric pressures of about 70 pounds/sq. inch pressure.

The operative temperature range for the preparation of the acid chlorides by the process of this invention depends on the choice of carboxylic acid employed. Generally, aliphatic carboxylic acids can be reacted at a temperature within the range of about 69° C. to about 120° C., aromatic carboxylic acids can be reacted at a temperature of about 69° C. to about 150° C., the proper temperature being determined by melting points and other factors. When employing the anhydride, the operative temperature range is from about 60° C. to 120° C., preferably 85 to 100° C.

Reaction times of from about 2 to 20 hours are thoroughly practical with the preferred range being from 4 to about 8 hours. Shorter or longer periods can also be feasibly employed depending upon the temperature (the higher temperatures usually permit the use of shorter reaction times), the diluent (if necessary), the carboxylic acid or acid anhydride used, and the manner in which the process is conducted, that is, batchwise or continuous process. Generally, a solvent or diluent is required only for carboxylic acids or anhydrides which melt in excess of 90° C. Materials which melt at about 90° C. or below can be reacted neat.

A variety of inert, organic solvents can be employed as diluents where required in the practice of the instant process, that is, saturated aliphatic hydrocarbons, aromatic hydrocarbons, halogen substituted aromatic hydrocarbons, saturated aliphatic ethers, saturated cycloaliphatic ethers, and halogen substituted saturated hydrocarbons.

Phosgene is reacted in a 1:1 molar ratio with each carboxylic acid or anhydride group present in the molecule. A few percent excess phosgene is beneficial in each case to replace phosgene lost by entrainment with exhaust gases.

The formed acid chlorides can be separated and recovered from the reaction medium by any suitable means, such as distillation, precipitation followed by filtration, and recrystallization.

The following examples will illustrate the present invention.

EXAMPLE 1

Preparation of lauroyl chloride utilizing imidazole as a catalyst

A 1-liter, 3-neck flask, fitted with a paddle stirrer, a gas inlet tube, a thermowell and a Dry-Ice cold finger, was charged with 150 grams lauric acid, 200 grams chlorobenzene and 0.8 gram imidazole. The flask was heated with stirring to 90° C. and phosgene sparged in until no more exhaust gases were evolved. The reaction temperature was 90–100° C. during the phosgene feed. Distillation of the reaction mixture yielded 152.6 grams of lauroyl chloride (93%) over a boiling range of 113–115° C. at 1.5 mm. pressure.

EXAMPLE 2

Preparation of lauroyl chloride utilizing triethyltriazine as a catalyst

A 1-liter, 3-neck flask was fitted as in Example 1 and charged as follows:

150 g. lauric acid
200 g. chlorobenzene
2.5 g. triethyltriazine

Reaction was similar to that in Example 1, but over a reaction temperature of 83–90° C. Lauroyl chloride was obtained by distillation in 94.5% yield (154.7 g.).

EXAMPLE 3

Preparation of butanoyl chloride utilizing benzimidazole as a catalyst

A 1-liter, 3-neck flask was fitted as in Example 1 and charged as follows:

66 g. butyric acid
200 g. chlorobenzene
1.8 g. benzimidazole

Reaction was similar to that in Example 1, but over a reaction temperature of 87–90° C. to yield 45.5 g. of a mixture of butanoyl chloride and chlorobenzene distilling at 111–113° C. at atmospheric pressure. Inorganic chloride analysis indicated the mixture to be 73.5% butanoyl chloride (42% yield).

EXAMPLE 4

Preparation of m-nitrobenzoyl chloride utilizing 2-methylimidazole as a catalyst A 1-liter, 3-neck flask was fitted as in Example 1 and charged as follows:

167 g. m-nitrobenzoic acid
200 g. chlorobenzene
1.23 g. 2-methylimidazole

Reaction was similar to that in Example 1, but over a temperature range of 90–100° C. m-Nitrobenzoyl chloride was obtained in 92% yield (170.1 g.) over the boiling range of 111–113° C. at 2 mm. pressure.

EXAMPLE 5

Preparation of methacryloyl chloride utilizing imidazole as a catalyst

A 1-liter, 3-neck flask was fitted as in Example 1 and charged as follows:

215.0 g. methacrylic acid
0.85 g. imidazole

Reaction was similar to that in Example 1, but over a temperature range of 89–96° C. Methacryloyl chloride was obtained in 82.6% yield (215.5 g.) over the boiling range of 99–100° C. at atmospheric pressure. Hydroquinone was utilized as a polymerization inhibitor.

EXAMPLE 6

Preparation of trimellitoyl chloride utilizing imidazole as a catalyst

A 1-liter, 3-neck flask was fitted as in Example 1 and charged as follows:

192 g. trimellitic anhydride
200 g. chlorobenzene
0.34 g. imidazole

Reaction was similar to that in Example 1, but over a temperature range of 89–102° C. Trimellitoyl chloride was obtained in 96.1% yield (202.1 grams) over the boiling range of 129–140° C. at 2 mm. pressure.

EXAMPLE 7

Preparation of lauroyl chloride utilizing benzotriazole as a catalyst

A 1-liter, 3-neck flask was fitted as in Example 1 and charged as follows:

150 g. lauric acid
1.8 g. benzotriazole

Reaction was similar to that in Example 1, but over a temperature range of 95–116° C. Lauroyl chloride was obtained by distillation in 68% yield (111.7 g.).

EXAMPLE 8

Preparation of chloroacetyl chloride utilizing imidazole as a catalyst

A 500 ml., 3-neck flask was fitted as in Example 1 and charged as follows:

141.8 g. monochloroacetic acid
0.51 g. imidazole

Reaction was similar to that in Example 1, but over a temperature range of 86–110° C. Monochloroacetyl chloride was obtained in 93.1% yield (157.7 g.) at the boiling point of 106.5° C. at atmospheric pressure.

EXAMPLE 9

Preparation of lauroyl chloride utilizing phenazine as a catalyst

A 1-liter, 3-neck flask was fitted as in Example 1 and charged as follows:

200 g. lauric acid
3.6 g. phenazine

Reaction was similar to that in Example 1, but over a temperature range of 73–94° C. Lauroyl chloride was obtained by distillation in 88% yield (192.6 g.).

EXAMPLE 10

Preparation of butanoyl chloride utilizing imidazole as a catalyst

A 1-liter, 3-neck flask was fitted as in Example 1 and charged as follows:

158 g. butyric anhydride
1.36 g. imidazole

Reaction was similar to that in Example 1, but over a temperature range of 70–119° C. Butanoyl chloride was obtained in 86% yield (183.2 g.) at 99° C. and atmospheric pressure.

EXAMPLE 11

Preparation of benzoyl chloride utilizing imidazole as a catalyst

A 500 ml., 3-neck flask was fitted as in Example 1 and charged as follows:

113 g. benzoic anhydride
0.68 g. imidazole

Reaction was similar to that in Example 1, but over a temperature range of 75–103° C. Benzoyl chloride was obtained in 87.5% yield (123 g.) over the boiling range of 78–83° C. at 7–15 mm. pressure.

EXAMPLE 12

This example demonstrates catalyst recycle of imidazole for the preparation of lauroyl chloride.

A 500 ml., 3-neck flask was fitted as in Example 1 and charged as follows:

200 g. lauric acid
0.34 g. imidazole

Reaction was similar to that in Example 1, but over a temperature range of 84.5–103° C. Lauroyl chloride was obtained by distillation over the boiling range of 111.0–111.5° C. at 1.2 mm. pressure.

Fresh lauric acid was charged directly on top of the cooled distillation residue and the mixture phosgenated as in Example 1, but over a temperature range of 88–100° C. Lauroyl chloride was obtained by distillation.

Fresh lauric acid was again charged directly on top of the cooled distillation residue and the phosgenation reaction repeated. The overall yield of lauroyl chloride for the three recycle reactions was 89.4%.

EXAMPLE 13

Preparation of benzoyl chloride utilizing imidazole as a catalyst

A 1-liter, 3-neck flask was fitted as in Example 1 and charged as follows:

122.0 g. benzoic acid
0.34 g. imidazole

Reaction was similar to that in Example 1, but over a temperature range of 90–93° C. Benzoyl chloride was obtained by distillation in 97.4% yield (136.9 g.) at the boiling point of 80° C. at 10 mm. pressure.

EXAMPLE 14

Preparation of isophthaloyl chloride utilizing imidazole as a catalyst

A 1-liter, 3-neck flask was fitted as in Example 1 and charged as follows:

166.0 g. isophthalic acid
200 ml. chlorobenzene
0.68 g. imidazole

Reaction was similar to that in Example 1, but over a temperature range of 105–115° C. Isophthaloyl chloride was obtained in 96.3% yield (195.5 g.) at the boiling point of 105° C. at 2 mm. pressure.

EXAMPLE 15

Preparation of sebacoyl chloride utilizing imidazole as a catalyst

A 1-liter, 3-neck flask was fitted as in Example 1 and charged as follows:

202.0 g. sebacic acid
350 ml. chlorobenzene
0.34 g. imidazole

Reaction was similar to that in Example 1, but over a temperature range of 90–98° C. Sebacoyl chloride was obtained in 81.4% yield (194.5 g.) at the boiling point of 149° C. at 2 mm. pressure.

EXAMPLE 16

Preparation of adipoyl chloride utilizing imidazole as a catalyst

A 1-liter, 3-neck flask was fitted as in Example 1 and charged as follows:

146.0 g. adipic acid
200 ml. chlorobenzene
0.34 g. imidazole

Reaction was similar to that in Example 1, but over a temperature range of 89–92° C. Adipoyl chloride was obtained in 87.2% yield (161.5 g.) at the boiling point of 100° C. at 5 mm. pressure.

EXAMPLE 17

Preparation of neo-pentanoyl chloride utilizing imidazole as a catalyst

A 1-liter, 3-neck flask was fitted as in Example 1 charged as follows:

102.0 g. neo-pentanoic acid
0.34 g. imidazole

Reaction was similar to that in Example 1, but over a temperature range of 88–95° C. neo-Pentanoyl chloride was obtained in 69.7% yield (85.0 g.) at the boiling point of 105° C. at atmospheric pressure.

EXAMPLE 18

Preparation of cyclohexanecarboxyloyl chloride utilizing imidazole as a catalyst A 1-liter, 3-neck flask was fitted as in Example 1 and charged as follows:

128.0 g. cyclohexanecarboxylic acid
0.34 g. imidazole

Reaction was similar to that in Example 1, but over a temperature range of 88–92° C. Cyclohexanecarboxyloyl chloride was obtained in 96.6% yield (141.5 g.) at the boiling point of 74.5° C. at 20 mm. pressure.

EXAMPLE 19

Preparation of phenylacetyl chloride utilizing imidazole as a catalyst

A 1-liter, 3-neck flask was fitted as in Example 1 and charged as follows:

136.0 g. phenylacetic acid
0.34 g. imidazole

Reaction was similar to that in Example 1, but over a temperature range of 85–94° C. Phenylacetyl chloride was obtained in 89.5% yield (138.0 g.) at the boiling point of 93° C. at 15 mm. pressure.

EXAMPLE 20

Preparation of p-chlorobenzoyl chloride utilizing imidazole as a catalyst

A 1-liter, 3-neck flask was fitted as in Example 1 and charged as follows:

136.5 g. p-chlorobenzoic acid
200 ml. chlorobenzene
0.34 g. imidazole

Reaction was similar to that in Example 1, but over a temperature range of 90–100° C. p-Chlorobenzoyl chloride was obtained in 95.0% yield (166.6 g.) at the boiling point of 100° C. at 15 mm. pressure.

EXAMPLE 21
Preparation of trans-cinnamoyl chloride utilizing imidazole as a catalyst A 1-liter, 3-neck flask was fitted as in Example 1 and charged as follows:
123.0 g. trans-cinnamoyl chloride
175 ml. chlorobenzene
0.28 g. imidazole Reaction was similar to that in Example 1, but over a temperature range of 90–94° C. Trans-cinnamoyl chloride was obtained in 92.0% yield (127.0 g.) at the boiling point of 82° C. at 2 mm. pressure.

EXAMPLE 22
Preparation of m-toluoyl chloride utilizing imidazole as a catalyst A 1-liter, 3-neck flask was fitted as in Example 1 and charged as follows:
136.0 g. m-toluic acid
200 ml. chlorobenzene
0.34 g. imidazole Reaction was similar to that in Example 1, but over a temperature range of 89–100° C. m-Toluoyl chloride was obtained in 2.86% yield (140.3 g.) at the boiling point of 94° C. at 15 mm. pressure.

EXAMPLE 23
Preparation of lauroyl chloride utilizing 2-benzothiazole as a catalyst A 1-liter, 3-neck flask was fitted as in Example 1 and charged as follows:
200 g. lauric acid
2.7 g. 2-benzothiazole Reaction was similar to that in Example 1, but over a temperature range of 88–95° C. Lauroyl chloride was obtained in 96.5% yield (211.0 g.) by distillation.

EXAMPLE 24
Preparation of lauroyl chloride utilizing thiazole as a catalyst

A 1-liter, 3-neck flask was fitted as in Example 1 and charged as follows:
118.0 g. lauric acid
1.0 g. thiazole Reaction was similar to that in Example 1, but over a temperature range of 85–95° C. Lauroyl chloride was obtained in 91.5% yield (118.1 g.) by distillation.

EXAMPLE 25
Preparation of lauroyl chloride utilizing acetone oxime as a catalyst A 1-liter, 3-neck flask was fitted as in Example 1 and charged as follows:
200 g. lauric acid
1.46 g. acetone oxime Reaction was similar to that in Example 1, but over a temperature range of 88–91° C. Lauroyl chloride was obtained in 57.5% yield (125.6 g.) by distillation.

In a similar manner benzaldoxime proved to be an effective catalyst.

EXAMPLE 26
Preparation of lauroyl chloride utilizing 3-n-butyl-4 (or 5)-methyl-1,2,3-triazole as a catalyst A 1-liter, 3-neck flask was fitted as in Example 1 and charged as follows:
200.0 g. lauric acid
3.1 g. 3-n-butyl-4 (or 5)-methyl-1,2,3-triazole Reaction was similar to that in Example 1, but over a temperature range of 66–90° C. Lauroyl chloride was obtained in 96.5% yield (213.8 g.) by distillation.

EXAMPLE 27
Preparation of lauroyl chloride utilizing dicylohexylcarbodiimide as a catalyst A 1-liter, 3-neck flask was fitted as in Example 1 and charged as follows:
200.0 g. lauric acid
4.1 g. dicyclohexylcarbodiimide Reaction was similar to that in Example 1, but over the temperature range of 78–100° C. Lauroyl chloride was obtained in 95.0% yield (211.0 g.) by distillation.

EXAMPLE 28
Preparation of lauroyl chloride utilizing 1,5-diazobicyclo[5.4.0]undec-5-ene as a catalyst A 1-liter, 3-neck flask was fitted as in Example 1 and charged as follows:
200.0 g. lauric acid
1.52 g. 1,5-diazobicyclo[5.4.0]undec-5-ene Reaction was similar to that in Example 1, but over a temperature range of 90–106° C. Lauroyl chloride obtained in 96.0% yield (209.5 g.) by distillation.

EXAMPLE 29
Preparation of lauroyl chloride utilizing quinoxaline as a catalyst A 1-liter, 3-neck flask was fitted as in Example 1 and charged as follows:
200.0 g. lauric acid
2.6 g. quinoxaline Reaction was similar to that in Example 1, but over a temperature range of 91–100° C. Lauroyl chloride was obtained in 92.5% yield (200.2 g.) by distillation.

EXAMPLE 30
Preparation of lauroyl chloride utilizing pyridazine as a catalyst A 1-liter, 3-neck flask was fitted as in Example 1 and charged as follows:
200.0 g. lauric acid
1.6 g. pyridazine Reaction was similar to that in Example 1, but over a temperature range of 74–100° C. Lauroyl chloride was obtained in 63.0% yield (138.3 g.) by distillation.

EXAMPLE 31
Preparation of lauroyl chloride utilizing 2,5-dimethyl-1,3,4-oxadiazole as a catalyst A 1-liter, 3-neck flask was fitted as in Example 1 and charged as follows:
200.0 g. lauric acid
1.96 g. 2,5-dimethyl-1,3,4-oxadiazole Reaction was similar to that in Example 1, but over a temperature range of 82–100° C. Lauroyl chloride was obtained in 94.0% yield (205.0 g.) by distillation.

EXAMPLE 32
Preparation of lauroyl chloride utilizing 3,5-dimethylisoxazole as a catalyst A 1-liter, 3-neck flask was fitted as in Example 1 and charged as follows:
200.0 g. lauric acid
1.94 g. 3,5-dimethylisoxazole Reaction was similar to that in Example 1, but over a temperature range of 90–102° C. Lauroyl chloride was obtained in 83.0% yield (181.0 g.) by distillation.

EXAMPLE 33

Preparation of lauroyl chloride utilizing pyrimidine as a catalyst

A 1-liter, 3-neck flask was fitted as in Example 1 and charged as follows:

200.0 g. lauric acid
1.6 g. pyrimidine

Reaction was similar to that in Example 1, but over a temperature range of 87–100° C. Lauroyl chloride was obtained in 53.0% yield (116.0 g.) by distillation.

EXAMPLE 34

Preparation of lauroyl chloride utilizing Shift's base of isobutyraldehyde and n-butylamine as a catalyst A 1-liter, 3-neck flask was fitted as in Example 1 and charged as follows:

200.0 g. lauric acid
2.54 g. Shift's base of isobutyraldehyde and n-butylamine

Reaction was similar to that in Example 1, but over a temperature range of 80–94° C. Lauroyl chloride was obtained in 93.0% yield (203.0 g.) by distillation.

In a similar manner the Shift's bases of glyoxal and cyclohexylamine, N-benzylidene methylamine, and N-benzylidene aniline were found to be effective catalysts.

EXAMPLE 35

Preparation of lauroyl chloride utilizing enamine of isobutyraldehyde and methylamine as a catalyst A 1-liter, 3-neck flask was fitted as in Example 1 and charged as follows:

200.0 g. lauric acid
2.0 g. enamine of isobutyraldehyde and methylamine

Reaction was similar to that in Example 1, but over a temperature range of 88–101° C. Lauroyl chloride was obtained in 94.5% yield (206.8 g.) by distillation.

EXAMPLE 36

Preparation of sorboyl chloride utilizing imidazole as a catalyst

A 1-liter, 3-neck flask was fitted as in Example 1, and charged as follows:

112.0 g. sorbic acid
0.34 g. imidazole
200 ml. chlorobenzene

Reaction was similar to that in Example 1, except over a temperature range of 87–90° C. Sorboyl chloride was obtained in 78.3% yield (102.0 g.) by distillation at 81° C. at 20 mm. pressure.

Although the invention has been illustrated by the preceding examples, it is not to be construed as limited to the materials employed therein, but rather the invention encompasses the generic area as hereinbefore disclosed. Various changes and modifications can be made in practicing the present invention without departing from it and, therefore, it is intended to include in the scope of the appended claims all such modifications and variations as may be apparent to those skilled in the art from the description and illustrative examples given herein.

What is claimed is:

1. A process for the preparation of acid chlorides which comprises contacting a member selected from the group consisting of carboxylic acids and acid anhydrides with phosgene in the presence of a catalytic amount of compound selected from the group consisting of compounds of the general formula:

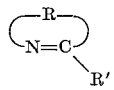

wherein R is

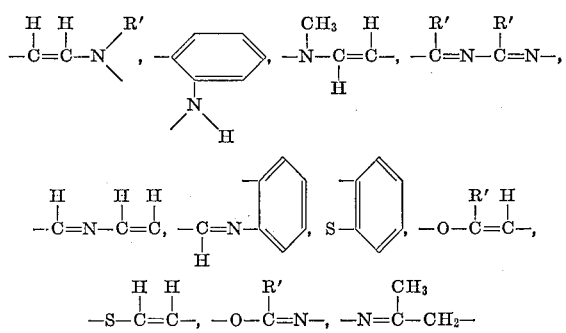

wherein R' is hydrogen or alkyl containing 1 to 4 carbon atoms; compounds of the formula:

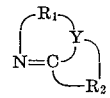

wherein $R_1$ is

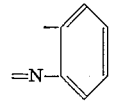

or a polymethylene group containing 3 to 5 carbon atoms, $R_2$ is

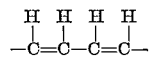

or a polymethylene group containing 3 to 5 carbon atoms, with the proviso that when $R_1$ is

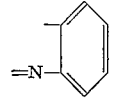

and $R_2$ is

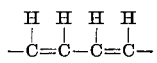

then y is carbon, and when $R_1$ and $R_2$ are polymethylene groups of 3 to 5 carbon atoms, then y is nitrogen; compounds of the formula:

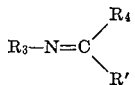

wherein $R_3$ is alkyl, an alicyclic group, or hydroxyl, $R_4$ is alkyl, aryl, or an

alicyclic group, R' is as above defined; compounds of the formula:

$$R_5—N=C—R_6$$

wherein $R_5$ is an alicyclic group, $R_6$ is an =N— alicyclic group; and compounds of the formula:

wherein X is

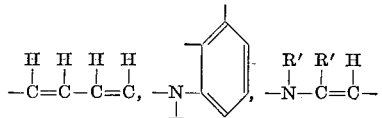

wherein R' is as above defined.

2. A process according to claim 1 wherein said catalyst compound is represented by the general formula:

$$\left(\begin{array}{c}-R-\\N=C\\|\\R'\end{array}\right)$$

wherein R is $$-\overset{H}{\underset{|}{C}}=\overset{H}{\underset{|}{C}}-N\overset{R'}{\underset{\diagdown}{\diagup}}\ ,\quad \diagup\!\!\!\!\bigcirc\!\!\!\!\diagdown\ ,\quad -N-\overset{CH_3}{\underset{|}{C}}=\overset{H}{\underset{|}{C}}-,$$

$$-\overset{R'}{\underset{|}{C}}=N-\overset{R'}{\underset{|}{C}}=N-,\quad -\overset{H}{\underset{|}{C}}=N-\overset{H}{\underset{|}{C}}=\overset{H}{\underset{|}{C}}-,\quad \overset{\diagup\!\!\!\!\bigcirc\!\!\!\!\diagdown}{\underset{H}{\diagdown}}C=N-\diagup\!\!\!\!\bigcirc\!\!\!\!\diagdown,$$

$$S-\!\!\diagup\!\!\!\!\bigcirc\!\!\!\!\diagdown,\ -O-\overset{R'}{\underset{|}{C}}=\overset{H}{\underset{|}{C}}-,\ -S-\overset{H}{\underset{|}{C}}=\overset{H}{\underset{|}{C}}-,\ -O-\overset{R'}{\underset{|}{C}}=N-,\ -N=\overset{CH_3}{\underset{|}{C}}-CH_2-$$

R' is hydrogen or alkyl of 1 to 4 carbon atoms.

3. A process according to claim 1 wherein said catalyst compound is represented by the general formula:

$$\left(\begin{array}{c}-R_1-\\N=C\\|\\R_2\end{array}\right)Y$$

wherein $R_1$ is $$=N-\!\!\diagup\!\!\!\!\bigcirc\!\!\!\!\diagdown$$

or a polymethylene group containing 3 to 5 carbon atoms, $R_2$ is $$-\overset{H}{\underset{|}{C}}=\overset{H}{\underset{|}{C}}-\overset{H}{\underset{|}{C}}=\overset{H}{\underset{|}{C}}-$$

or a polymethylene group containing 3 to 5 carbon atoms, with the proviso that when $R_1$ is $$=N-\!\!\diagup\!\!\!\!\bigcirc\!\!\!\!\diagdown$$

and $R_2$ is $$-\overset{H}{\underset{|}{C}}=\overset{H}{\underset{|}{C}}-\overset{H}{\underset{|}{C}}=\overset{H}{\underset{|}{C}}-$$

then Y is carbon, and when $R_1$ and $R_2$ are polymethylene groups of 3 to 5 carbon atoms, then Y is nitrogen.

4. A process according to claim 1 wherein said catalyst compound is represented by the general formula:

$$\overset{R_3}{\underset{\diagdown}{}}N=C\overset{R_4}{\underset{\diagup}{\diagdown}}$$
$$\qquad\qquad R'$$

wherein $R_3$ is alkyl, an alicyclic group, or hydroxyl, $R_4$ is alkyl, aryl, or an $$-\overset{H}{\underset{|}{C}}=N-$$

alicyclic group, R' is as above defined.

5. A process according to claim 1 wherein said catalyst compound is representd by the general formula:

$$R_5-N=C-R_6$$

wherein $R_5$ is an alicyclic group $R_6$ is an =N— alicyclic group.

6. A process according to claim 1 wherein said catalyst compound is represented by the general formula:

$$\left(\begin{array}{c}-X-\\N=N\end{array}\right)$$

wherein X is $$-\overset{H}{\underset{|}{C}}=\overset{H}{\underset{|}{C}}-\overset{H}{\underset{|}{C}}=\overset{H}{\underset{|}{C}}-,\quad -N-\!\!\diagup\!\!\!\!\bigcirc\!\!\!\!\diagdown\ ,\quad -N-\overset{R'}{\underset{|}{C}}=\overset{H}{\underset{|}{C}}-,$$
$$\qquad\qquad\qquad\qquad\qquad\qquad\quad\ \ \overset{|}{H}$$

wherein R' is as above defined.

7. A process according to claim 1 wherein said carboxylic acids are selected from the group consisting of aliphatic carboxylic acids of 2 to about 20 carbon atoms; aromatic carboxylic acids of 7 to about 24 carbon atoms containing 1 to 3 carboxyl groups, cycloaliphatic carboxylic acids of 7 to about 24 carbon atoms containing 1 to 3 carboxyl groups and wherein said acid anhydrides are represented by the formula:

$$\begin{array}{c}R-C\overset{O}{\underset{\diagdown}{\diagup}}\\ \qquad\qquad O\\ R-C\overset{\diagup}{\underset{\diagdown}{}}\\ \qquad\quad O\end{array}$$

wherein each R individually represents a hydrocarbon group of 1 to 24 carbon atoms.

8. A process according to claim 2 wherein R is $$-\overset{H}{\underset{|}{C}}=\overset{H}{\underset{|}{C}}-N\overset{R'}{\underset{\diagdown}{\diagup}}$$

9. A process according to claim 2 wherein R is $$\diagup\!\!\!\!\bigcirc\!\!\!\!\diagdown$$
$$\underset{H}{\overset{|}{N}}\diagdown$$

10. A process according to claim 2 wherein R is $$-N-\overset{CH_3}{\underset{|}{C}}=\overset{H}{\underset{|}{C}}-$$
$$\qquad\quad\ \overset{|}{H}$$

11. A process according to claim 2 wherein R is $$-\overset{R'}{\underset{|}{C}}=N-\overset{R'}{\underset{|}{C}}=N-$$

12. A process according to claim 2 wherein R is $$-\overset{H}{\underset{|}{C}}=N-\overset{H}{\underset{|}{C}}=\overset{H}{\underset{|}{C}}-$$

13. A process according to claim 2 wherein R is $$\diagup\!\!\!\!\bigcirc\!\!\!\!\diagdown$$
$$\underset{H}{\diagdown}C=N-$$

14. A process according to claim 2 wherein R is $$-O-\overset{R'}{\underset{|}{C}}=\overset{H}{\underset{|}{C}}-$$

15. A process according to claim 2 wherein R is $$\diagup\!\!\!\!\bigcirc\!\!\!\!\diagdown$$
$$-S$$

16. A process according to claim 2 wherein R is

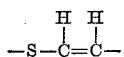

17. A process according to claim 2 wherein R is

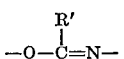

18. A process according to claim 3 wherein R₁ is

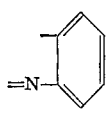

Y is carbon and R is

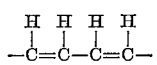

19. A process according to claim 3 wherein R₁ and R₂ taken individually is a polymethylene group containing 3 to 5 carbon atoms, and R₂ is nitrogen.

20. A process according to claim 6 wherein X is

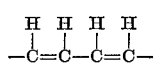

21. A process according to claim 6 wherein X is

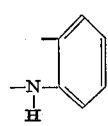

22. A process according to claim 6 wherein X is

23. A process according to claim 7 wherein said catalyst is imidazole.

24. A process according to claim 7 wherein said catalyst is 1-methylimidazole.

25. A process according to claim 7 wherein said catalyst is 2-methylimidazole.

26. A process according to claim 7 wherein said catalyst is 1,2-dimethylimidazole.

27. A process according to claim 7 wherein said carboxylic acid is lauric acid, said catalyst is imidazole and said acid chloride is lauroyl chloride.

28. A process according to claim 2 wherein R is

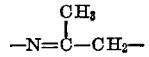

References Cited

UNITED STATES PATENTS

| | | | |
|---|---|---|---|
| 2,657,233 | 10/1953 | Carnahan | 260—544 |
| 2,279,985 | 4/1942 | Graenacher | 260—408 |
| 3,149,155 | 9/1964 | Seefelder | 260—544 |

FOREIGN PATENTS

| | | | |
|---|---|---|---|
| 540,096 | 10/1941 | Great Britain | 260—408 |

LEWIS GOTTS, Primary Examiner

C. L. MILLS, Assistant Examiner

U.S. Cl. X.R.

260—544